United States Patent Office 3,142,177
Patented July 28, 1964

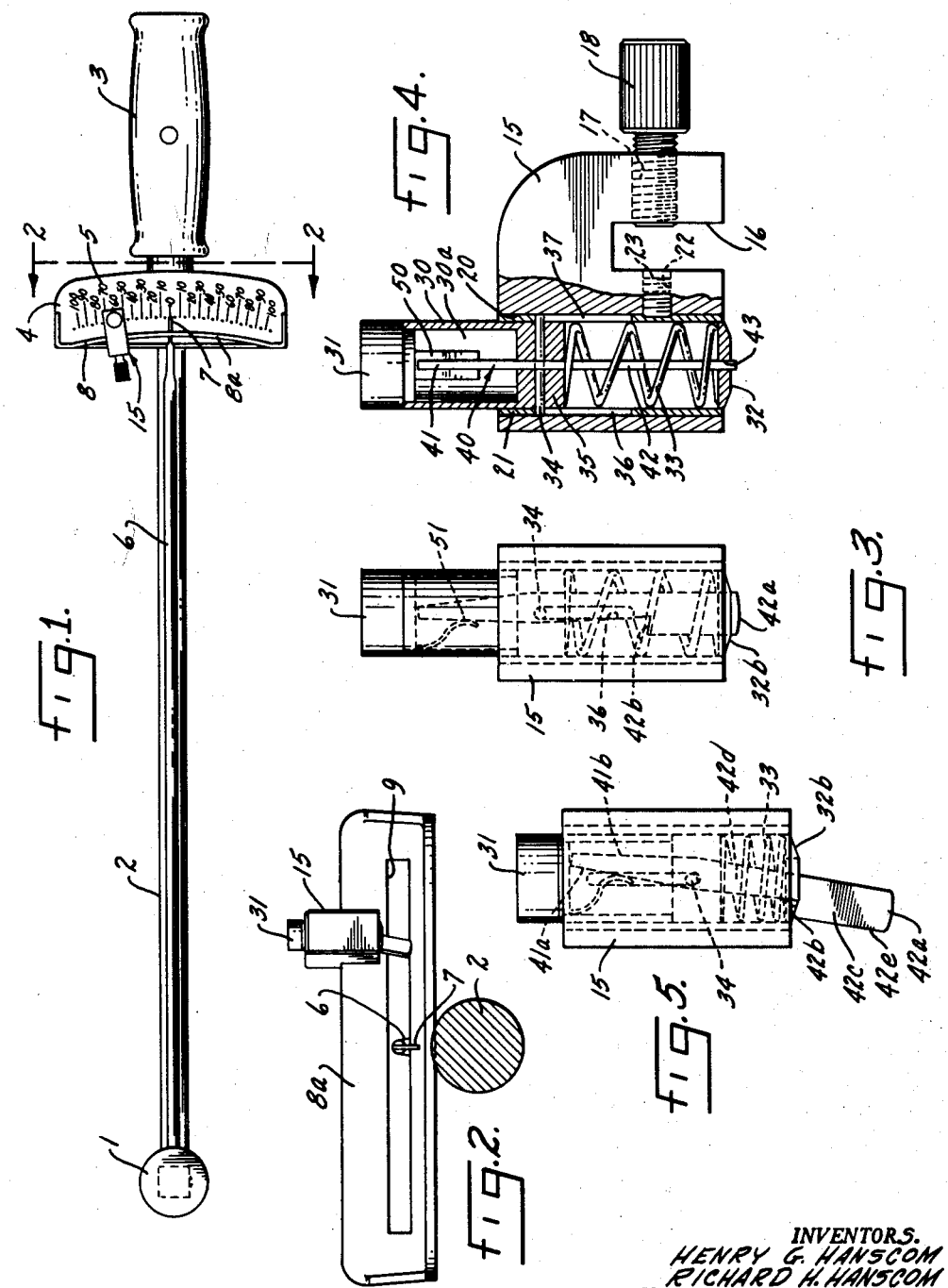

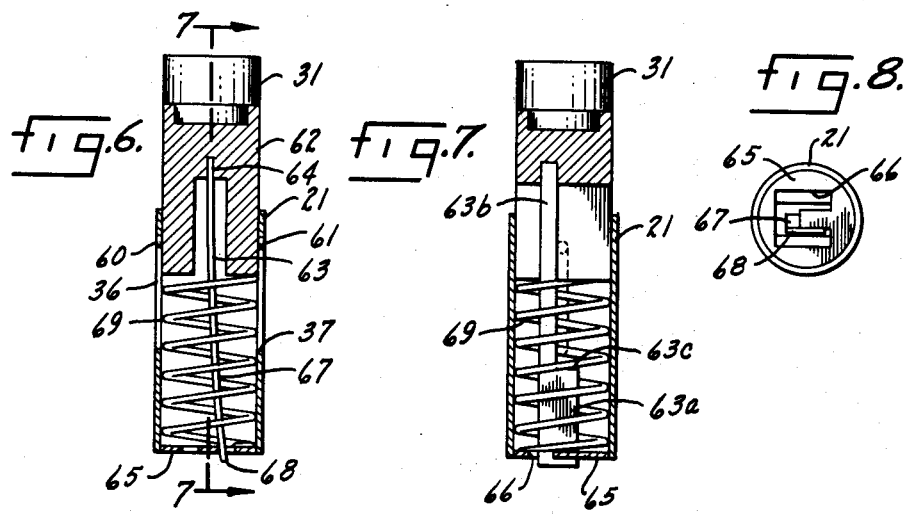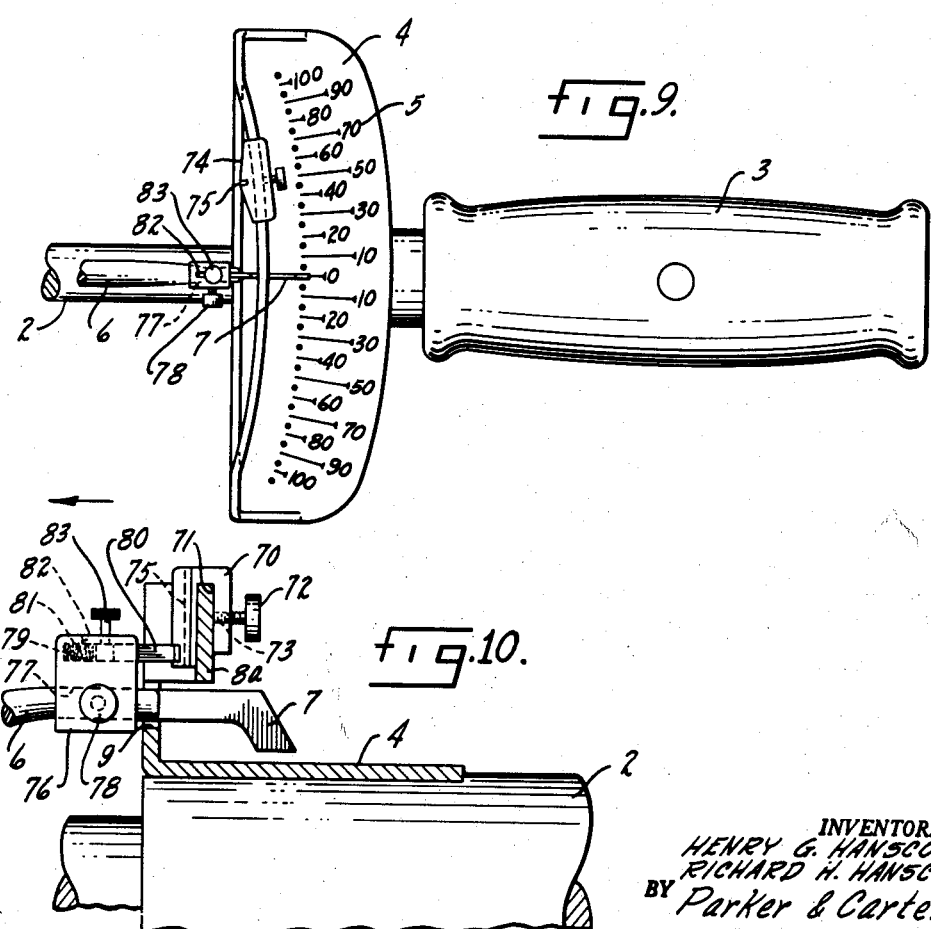

3,142,177
TORQUE SENSING MECHANISM
Henry G. Hanscom and Richard H. Hanscom, both of 338 N. Kenilworth Ave., Elmhurst, Ill.
Filed Feb. 10, 1961, Ser. No. 88,550
10 Claims. (Cl. 73—139)

This invention relates to means for assuring the proper torquing of mechanical elements and has particular relation to a sensing attachment for torque wrenches and the like.

One purpose of the invention is to provide an accessory usable with a manually operated torque wrench to provide accurate employement of said torque wrench.

Another purpose is to provide an accessory usable with a manually operated torque wrench and to provide accurate operation of said torque wrench in comparatively remote areas in which indicating portions of the wrench may not be visible.

Another purpose is to provide a means usable with a manually operated torque wrench and effective to sense and indicate the point at which the wrench has achieved the pre-selected proper torque.

Another purpose is to provide a torque sensing and indicating means which shall be minutely sensitive in operation yet rugged in construction.

Another purpose is to provide a torque indicating and sensing means which may be adjustably positioned in relation to manually operated torque wrenches of various known constructions.

Another purpose is to provide a torque sensing accessory for use with torque wrenches, which accessory shall be of maximum simplicity in manufacture and use.

Manually operable torque wrenches of known construction have been in use for many years. Oftentimes such wrenches must be used in an area in which the operator is unable to observe the torque scale normally supplied as a part of or in association with such torque wrenches. In such instances, the operator may only estimate the amount of torque applied and the purpose of the torque wrench is thus frustrated. Torque wrenches could be formed with means of overcoming this problem in the torque wrench itself, but the economics of such construction tend to deter the widespread use of any such construction. It is, accordingly, one purpose of the invention to provide relatively simple and economic means which may be employed in association with the simplest and most economical manually operated torque wrench to achieve assured application of the proper amount of torque.

Other purposes will appear from time to time during the course of the specification and claims.

The invention is illustrated more or less diagrammatically in the accompanying drawings, wherein:

FIGURE 1 is a top plan view;
FIGURE 2 is a view taken on the line 2—2 of FIGURE 1 and on an enlarged scale;
FIGURE 3 is an end view with internal parts shown in dotted lines and on a still larger scale;
FIGURE 4 is a side view with parts broken away and parts in cross section;
FIGURE 5 is a view similar to that of FIGURE 3 and illustrating the parts in another position;
FIGURE 6 is a view in partial cross section and illustrating a variant form of an element of the invention;
FIGURE 7 is a side view of the structure illustrated in FIGURE 6 and taken on the line 7—7 of FIGURE 6;
FIGURE 8 is a bottom view of the structure illustrated in FIGURE 7;
FIGURE 9 is a top plan view of still another form of the invention; and FIGURE 10 is a side view, on an enlarged scale with parts in cross section and parts broken away, of the structure illustrated in FIGURE 9 with the parts in another position.

Like parts are indicated by like numerals throughout the specification and drawings.

Referring now to the drawings, and particularly to FIGURE 1, the numeral 1 illustrates generally a work-engaging means. It will be understood that the portion or means 1 may take a variety of forms each designed to grasp, directly or indirectly, the nut, bolt or other mechanical or work element to which torque is to be applied. Secured to member 1 and extending radially therefrom is an arm or rod 2. At the opposite end of rod 2, a manually operable handle element 3 is affixed. Affixed to the rod 2 adjacent handle 3 and extending transversely of rod 2 is an indicator scale plate 4 having numerical indications 5 on an upper surface thereof which indications rise in opposite directions from the numeral "0" at the center of scale 4 and overlying the center of rod 2. A pointer or indicator arm 6 is appropriately secured adjacent element 1 and overlies rod 2 for substantially the entire length thereof, the arm 6 having a pointed outer end 7 overlying scale 5. It will be realized that the arm 6 could take a variety of forms, such as the one shown, or the articulated configuration often employed in such circumstances, without departing from the nature and scope of the invention.

Affixed to the upper surface of scale plate 4, and lying in an arc above the scale 4, is a bridge 8. The bridge 8 may have formed therein, or may form with the upper surface of plate 4, a slot 9 through which the pointed end 7 of rod 6 extends. While it will be realized that torque wrenches may be initially provided with elements similar to the bridge 8 for a variety of purposes, such bridge may be supplied to torque wrenches not having similar elements formed in the original manufacture of the torque wrench.

Slidably mounted on the arcuate strip 8a forming the central portion of bridge 8, is a housing element 15. Housing element 15 has a downwardly open slot 16 formed therein to receive strip portion 8a of bridge 8. A threaded passage 17 is formed in housing 15 in alignment with a portion of slot 16, and locking means 18 is threadably engaged in threaded passage 17 to provide for removably locking housing 15 at a variety of points along strip 8a of bridge 8.

A continuous passage 20 is formed through block 15 in parallel spaced relationship with slot 16. Fitted into passage 20 is a hollow sleeve 21. A threaded passage 22 is formed in housing 15 in alignment with threaded passage 17 and communicating with the area within slot 16 at one of its ends and with the area within passage 20 at its other end. A second threaded locking means 23 is threadably engaged in passage 22 and extends into passage 20 to lock sleeve 21 therein. It will be observed that passage 22 and member 23 are of smaller diameter than passage 17 and member 18 whereby member 23 may be engaged in passage 22 by means of insertion of a tool through passage 17.

Movably mounted within the sleeve 21, for sliding contact with the inner surface thereof, is a torque sensing member or plunger 30. The member 30 may have its upper portion 31 colored brightly for ease of observation. A cap 32 closes the lower end of sleeve 21 and a spring 33 has its opposite ends in contact with the inner surface of cap 32 and the bottom surface of member 30 to urge the member 30 upwardly and partially outwardly of sleeve 21, as may be best observed in FIGURE 4, for example.

A pin 34 laterally penetrates a lower segment 35 of member 30 and extends outwardly on the opposite sides thereof for penetration of diametrically opposed slots 36, 37, longitudinally extending in the wall of sleeve 21.

Pivoted on pin 34 is a finger member 40 having an upper portion 41 extending into a chamber 30a in member 30 and a lower portion 42 extending through a slot 43 formed in cap 32. It will be observed that the spring 33 surrounds the lower portion 42 of finger 40 within sleeve 21. The lower end surface 42a of member 40 extends slightly below cap 32 when the parts are in the position shown in FIGURE 4.

A leaf spring 50 has one of its ends affixed to an inner surface of member 30 within chamber 30a and its opposite end in contact with the upper portion 41 of member 40, as best seen, for example, at 51 in FIGURE 3.

As may be best seen, perhaps, in FIGURES 3 and 5, the finger member 40 has its upper portion 41 with opposite edges formed in generally frusto-conical configuration with two parallel sides, as seen in FIGURE 4, and with converging end surfaces 41a, 41b, the spring 50 being in contact with surface 41a. The finger portion 42, intermediate the pin 34 and the end surface 42a, has a hook surface 42b formed at the juncture of a widened end portion 42c and the thinner portion 42d. It will be observed that the cap 32 has a peripheral conical portion 32b of substantially the angular relationship of surface 42b and for mating therewith, as best seen in FIGURES 3 and 5, in response to urging of spring 50 against finger 40 and spring 33 against member 30.

Referring now to FIGURES 6-8, a variant form of the invention is illustrated wherein, for convenience, identical numerals are supplied to those portions identical with the elements above-described. In the form of FIGURES 6-8, a pair of pins 60, 61 are affixed to the outer surface of member 62 which correspond in function with the ends of the pin 34 and member 30. Member 62 has affixed thereto an elongated leaf spring element 63 having one of its ends affixed to member 62 as indicated at 64. A cap, of generally planar configuration, as indicated at 65, closes the lower open end of sleeve 21 and has formed therein, as may be best seen in FIGURE 8, a U-shaped slot 66. The leaf spring 63 has its lower end portion 67 extending through slot 66 with its lower surface 68 extending beyond closure plate 65 at all positions of members 62 and 63. A spring 69 is positioned between plate 65 and member 62 to urge the latter away from plate 65.

As may be best seen in FIGURE 7, for example, the member 63 is of generally elongated rectilinear configuration having a widened lower surface 63a which, at its juncture with upper surface 63b forms a hook surface 63c. As may be best seen in FIGURES 6 and 8, the legs of the U-shaped slot 66 are positioned on opposite sides of the center line of plate 65 and member 62, and the end of member 63 is affixed to member 62 at a point in alignment with said center line.

Referring now to that form of the invention illustrated in FIGURES 9 and 10, a block member 70 has a longitudinal slot 71 formed therein for reception of bridge bar or strip 8a. A manually operable lock device 72 is threadably engaged with member 70 for turning in threaded aperture 73 formed therein and to contact a surface of member 8. The wall of member 70 opposite that in which aperture 73 is formed has a conical outer surface 74 with a vertical slot 75 formed at the apex thereof.

A second block or housing member 76 is removably carried by arm 6. A slot 77, indicated in dotted lines in FIGURE 9, is provided for reception of member 6 by member 76. A locking device 78, similar to that illustrated at 72, is provided for removably positioning member 76 on arm 6. A well 79 is formed in member 76 and arranged in parallel spaced relationship above member 6 with the open end of well 79 opposed to surface 74 of member 70. Slidingly positioned in well 79 is a finger member 80. A spring 81 is positioned in the base of well 79 to urge member 80 outwardly therefrom. A longitudinally disposed slot 82 is formed in the upper surface of member 76 and communicates with well 79. Affixed to member 80 and extending upwardly through slot 82 is a manually operable handle element 83.

The use and operation of the invention are as follows:

With the element 1 secured to the item to be torqued, the handle member 3 is moved in either clockwise or counterclockwise direction. Considering the invention in the form illustrated in FIGURES 1-5, the housing 15 has been previously moved along bar portion 8a and, by means 18, locked into a predetermined position on bar 8a. Said predetermined position will be such as to position the approach edge of slot 43 immediately above the desired torque indication on scale 4. Considering the parts as shown in FIGURE 1, for example, the handle element 3 will be moved in clockwise direction to apply torque, causing pointer 7 to move over the scale 4 from its central position to a position adjacent the numeral 60 on the upper part of the scale, as the scale appears in FIGURE 1. As the pointer reaches the numeral 60, it is brought into contact with the contact edge 42e and the finger 42 is thus caused, in response to continued movement of pointer 7, to rotate about pivot pin 34 against the intentionally weak action of spring 50. As the abutment offset surface 42b moves out of contact with the opposed surface 32b of cap 32, the enlarged finger segment 42c is in full alignment with the slot 43 and the spring 33 is effective to cause retraction of finger 40 and a rise of plunger 30, by snap action, upwardly out of housing 15, as appears in FIGURES 3 and 4.

The operator, observing the rapid rise of member 30, ceases further movement of handle 3 in clockwise direction and thus is assured of having applied the predetermined desired torque. Additionally, a clicking noise may be heard, and means may, when desired, be provided for creating a particular audible sound, as plunger 30 is snapped into extending position.

The operator resets the device of the invention by simply pressing downward on portion 31 of member 30 to re-cock the finger member 40, as appears in FIGURES 2 and 5.

While the device of FIGURES 1-5 is illustrated as being positioned for engagement in response to movement of pointer 7 in a counterclockwise direction along the face of scale 4, it will be realized that the housing 15 could be reversed in its position on bar 8a from that illustrated in FIGURES 1 and 2, in which case the finger 42 would be contacted and actuated by a more rearward portion of bar or arm 6.

Similarly, the housing 15 may be employed over the scale 4 in the opposite segment thereof from that in which it is illustrated in FIGURE 1 by 180 degrees of rotation of sleeve 21 in passage 20, the element 23 being retracted for this purpose and re-exerted against sleeve 21 in its new position.

The operation of the invention in the form illustrated in FIGURES 6-8 is substantially similar. The operator cocks the mechanism by downward pressure on plunger 62. The leaf spring 63 is designed for snap action into a vertical position in alignment with the center line of housing 62 and plate 65. In such position, the hook segment 63c is engaged with the portion of plate 65 between the legs of the U-shaped slot 66, thus retaining the member 62 in retracted position in sleeve 21 against the action of spring 69, and the device is double acting, since the locking of plunger 62 is released upon movement of member 63 in either opposite direction toward either leg of slot 66. The leg of slot 66 beyond member 63 from the pointer 7 is positioned over the desired torque designation on scale 4. Upon actuating contacting of pointer 7, whether pointer 7 is to be moved in clockwise or counterclockwise direction along scale 4, the lower segment 63a of leaf spring member 63 is brought into alignment with the desired leg of the U-shaped slot 66, thus disengaging the surface 63c from plate 65 and permitting the outward movement of member 62 from sleeve 21 in response to the action of spring 69, thus indicating to the operator that the predetermined desired torque has been reached.

It will be observed that members 40 and 63 are moved immediately and completely out of the path of travel of arm 6 when the desired torque is reached thus precluding bending, binding or injury to said members.

In the form of the invention illustrated in FIGURES 9–10, a positive means of locking the torque arm 6 is provided. The housing 70 is positioned at the desired point along the bar 8a with the slot 75 in alignment with the desired amount of torque, as shown on scale member 4, the housing 70 being positionable in alignment with either set of numerals on scale 4. Movement of handle member 3 in either direction thus causes reverse relative movement of rod 6 and pointer 7 along scale 4 to bring the finger 80 into engagement with inclined surface 74 of housing 70. Continued movement of handle 3 causes a restraction of finger 80 against the action of spring 81 as more of the inclined surface 74 is traversed by finger 80. When, however, finger 80 reaches alignment with slot 75, the spring 81 is effective to move the finger 80 into locking engagement with slot 75, as illustrated in FIGURE 10. Thus, the sudden snap action of spring 81 determines that the operator has reached the desired amount of torque. In order to release the mechanism, the operator merely retracts, by finger action, the member 83, as indicated by the arrow in FIGURE 10, to retract finger 80 from slot 75 and thus to permit the return of the rod 6 and pointer 7 to the neutral position illustrated, for example, in FIGURE 9. Release of member 83 by the operator permits spring 81 to return the finger 80 to extended position for re-engagement with the surface 74 upon further employment of the torque wrench.

Whereas, there has been shown and described and claimed an operative device or devices, many changes could be made therein without departing from the nature and scope of the invention. For example, the devices of FIGURES 3 and 6 could be carried on arm 6 and an abutment movably positioned on bar 8a and housing 70 and 76 could be reversed in position. We therefore wish to be limited only within the scope of the appended claims.

We claim:

1. In a torque wrench a work engaging element, a rod rigidly attached to said element and extending radially therefrom, a scale supported on said rod, an indicating arm secured to said element and having a pointer portion movably overlying said scale, a support adjacent said scale and a sensing means adjustably carried by said support, said sensing means comprising a housing and means for movably positioning said housing at a variety of points on said support, a plunger member on said housing, a finger member pivotally carried by said plunger, yielding means positioned between said plunger and said housing to urge said plunger outwardly from said housing, hook means on said finger, a second yielding means positioned to urge said hook means into engagement with said housing when said plunger is in its innermost position in said housing, said pointer being movable into engagement with said finger to release said hook means and to free said plunger for actuation by said first yielding means.

2. A torque wrench comprising a work engaging element, a rod rigidly fixed to said work engaging element and extending radially therefrom, a spring arm secured at one of its ends to said work engaging element and extending along said rod in parallel relationship therewith, the opposite end of said spring arm being free, a scale laterally supported on said rod beneath the free ends of said arm, a support bar positioned above said scale, a housing carried by said bar, and means in and extending from said housing for indicating a predetermined position of said pointer over said scale, said means including locking elements for attaching said housing at a plurality of points on said bar, a plunger yieldingly urged from said housing and hook means engageable by said spring arm, said hook means being positioned to retain said plunger against said urging until said hook means is engaged by said arm.

3. In a torque wrench a work engaging element, a rod rigidly secured to and extending from said element a pointer bar member secured to said element and extending along said rod, a scale carried by said rod, said pointer bar member having a free end portion overlying and movable along said scale in response to operation of said wrench, a support bar member overlying said scale, means carried by at least one of said members and effective to indicate a predetermined position of said pointer over said scale, said means including an element positionable at a plurality of points on said support member and an indicator element, yielding means normally urging said indicator element in one direction, a hook element normally holding said indicator element in retracted position, said hook element including an extending release finger portion, said finger portion being positioned for actuation toward release position when said pointer member free end overlies a predetermined point on said scale.

4. For use with a torque wrench having a work-engaging element, a rod rigidly secured at one end to and extending from said element, a pointer arm secured at one end to said element and having a free opposite end, a scale carried by the opposite end of said rod beneath the free end of said pointer arm, said pointer arm free end being movable along said scale in response to operation of said wrench, the combination therewith of a torque wrench accessory comprising a housing, said housing having an attaching slot therein, lock means movably engaged in said housing and positioned for movement into said slot, an indicator plunger movably mounted in said housing, a finger carried by said plunger and extending therefrom in one direction, yielding means positioned in said housing to urge said plunger outwardly therefrom in another direction, hook means on said finger positioned to engage said housing when said plunger is imbedded therein, said hook means and finger being movable in response to movement of said pointer arm along said scale to a predetermined point thereon into plunger-releasing position to free said plunger for movement outwardly of said housing in response to said yielding means.

5. The structure of claim 4 wherein said finger member is movable in opposite directions to free said plunger.

6. In a torque wrench having a scale, a pointer movable over said scale, a support above said scale, a housing selectively carried by said support at one of a plurality of predetermined points thereon, a second housing carried by said pointer, one of said housings having a slot formed therein and open in one direction, the other of said housings having a finger member yieldingly urged outwardly therefrom in the opposite direction and positioned to engage said slot when said finger and said slot are positioned in alignment one with the other in response to movement of said pointer over said scale toward said predetermined point, and means on said other housing for manually retracting said finger to disengage the same from said slot.

7. For use with a torque wrench having a scale and a pointer movable over said scale in response to operation of said wrench, a support adjacent said scale, a member adjustably positionable at a plurality of points on said support and indicating means actuatable when said movable pointer is moved into predetermined location in relation to said adjustably positionable member, said indicating means including a housing, a plunger in said housing, yielding means positioned in said housing to urge said plunger outwardly therefrom, a finger member secured to said plunger and extending therefrom into a position for contact by said pointer, said finger having a hook portion engaging said housing and holding said yielding means inactive when said finger is in its extended position, said hook portion being released from engagement with said housing when said finger is moved by said pointer.

8. For use with a torque wrench having a work-engaging element, a rod rigidly secured at one end to and extending from said element, a pointer arm secured at one end to said element and having a free opposite end, a scale carried by the opposite end of said rod beneath the free end of said pointer arm, said pointer arm free end being movable along said scale in response to operation of said wrench, the combination therewith of an accessory for torque wrenches and the like comprising a housing positionable at one of a plurality of points adjacent said scale, said housing having a passage therein, a plunger slidably mounted in said passage, yielding means positioned in said housing to urge said plunger in one direction outwardly therefrom, a finger member carried by said plunger and extending outwardly in the opposite direction from said housing in position to be engaged by said pointer as said pointer moves along said scale to said predetermined point, said finger having a hook surface engaging said housing when said plunger is at substantially its innermost position in said housing, said hook surface being releasable from engagement with said housing when said finger is moved by said pointer arm.

9. The structure of claim 8 wherein said finger is pivoted on said plunger and characterized by and including a second yielding means positioned to urge said hook surface toward housing-engaging position.

10. The structure of claim 8 wherein said finger is formed of leaf spring material and wherein said housing has therein a generally U-shaped slot through which said finger extends.

References Cited in the file of this patent

UNITED STATES PATENTS

| | | |
|---|---|---|
| 296,405 | Greenwood | Apr. 8, 1884 |
| 1,735,086 | Paxson | Nov. 12, 1929 |
| 2,289,238 | Brunelli | July 7, 1942 |
| 2,385,591 | Sturtevant | Sept. 25, 1945 |
| 2,628,497 | Hart | Feb. 17, 1953 |
| 2,682,796 | Larson | July 6, 1954 |

FOREIGN PATENTS

| | | |
|---|---|---|
| 995,105 | France | Aug. 14, 1951 |